United States Patent
Sanchez Gutierrez et al.

(10) Patent No.: US 12,550,886 B2
(45) Date of Patent: Feb. 17, 2026

(54) METHOD FOR THE VITRIFICATION OF HUMAN SEMEN AND PORTABLE KIT FOR THE APPLICATION OF SAID METHOD

(71) Applicant: UNIVERSIDAD DE LA FRONTERA, Temuco (CL)

(72) Inventors: Raul Segundo Sanchez Gutierrez, Temuco (CL); Mabel Andrea Schulz Rubilar, Temuco (CL); Juan Jesus Alvarez Gonzalez, A Coruna (ES); Albert Obradors Cherta, Figueres (ES); Enrique Oquinena Muguerza, Vitoria-Gasteiz (ES)

(73) Assignee: UNIVERSIDAD DE LA FRONTERA, Temuco (CL)

( * ) Notice: Subject to any disclaimer, the term of this patent is extended or adjusted under 35 U.S.C. 154(b) by 971 days.

(21) Appl. No.: 17/058,245

(22) PCT Filed: May 25, 2018

(86) PCT No.: PCT/IB2018/053757
§ 371 (c)(1),
(2) Date: Nov. 24, 2020

(87) PCT Pub. No.: WO2019/224588
PCT Pub. Date: Nov. 28, 2019

(65) Prior Publication Data
US 2021/0186007 A1 Jun. 24, 2021

(51) Int. Cl.
*A01N 1/125* (2025.01)
*A01N 1/147* (2025.01)
*A01N 1/162* (2025.01)

(52) U.S. Cl.
CPC ............ *A01N 1/125* (2025.01); *A01N 1/147* (2025.01); *A01N 1/162* (2025.01)

(58) Field of Classification Search
CPC ... A01N 1/0221; A01N 1/0268; A01N 1/0284
See application file for complete search history.

(56) References Cited

U.S. PATENT DOCUMENTS

| | | | |
|---|---|---|---|
| 9,005,886 B2 | 4/2015 | Sanchez Gutierrez et al. | |
| 9,339,360 B2 * | 5/2016 | Uchiyama | A61D 19/024 |
| 2012/0251999 A1 | 10/2012 | Demirci et al. | |
| 2013/0260452 A1 * | 10/2013 | Toner | G01N 1/42 |
| | | | 435/307.1 |

FOREIGN PATENT DOCUMENTS

EP 2641966 A1 9/2013

OTHER PUBLICATIONS

Sage Media, Quinn's Advantage Sperm Freeze technical summary, Rev. Mar. 2003. (Year: 2003).*
Creemers, E., et al. "Cryopreservation of human sperm: efficacy and use of a new nitrogen-free controlled rate freezer versus liquid nitrogen vapour freezing." Andrologia 43.6 (2011): 392-397. (Year: 2011).*
Nidacon, "Sperm Cryoprotec" information page. (Year: 2023).*
Foote, R. H., and M. T. Kaproth. "Large batch freezing of bull semen: effect of time of freezing and fructose on fertility." Journal of dairy science 85.2 (2002): 453-456. (Year: 2002).*
Liu, Yue, et al. "A 3D printed vitrification device for storage in cryopreservation vials." Applied Sciences 11.17 (2021): 7977. (Year: 2021).*
Ziegler, William F., and Jane Chapitis. "Human motile sperm recovery after cryopreservation: freezing in nitrogen vapor vs the direct plunge technique." Primary Care Update for Ob/Gyns 5.4 (1998): 170. (Year: 1998).*
Creemers et al., "Cryopreservation of human sperm: efficacy and use of a new nitrogen-free controlled rate freezer versus liquid nitrogen vapour freezing". Andrologia, 2011, vol. 43, No. 6, pp. 392-397.
Sanchez et al., "Vitrificación de espermatozoides: una alternativa a la inyección intracitoplasmática de espermatozoides en paciente con oligoastenozoospermia severa", Andrologia, 2013, vol. 11, No. 1, pp. 36-39.
International Search Report for Corresponding International Application No. PCT/IB2018/053757 (3 Pages) (Oct. 24, 2018).

* cited by examiner

*Primary Examiner* — Kara D Johnson
*Assistant Examiner* — Constantina E Stavrou
(74) *Attorney, Agent, or Firm* — LUCAS & MERCANTI, LLP

(57) ABSTRACT

A method for human sperm vitrification is disclosed, which includes providing liquefied human sperm; having a vitrification medium, where the vitrification medium has (a) a sperm buffer, and (b) a cryoprotectant mixture including a permeable cryoprotectant and a non-permeable cryoprotectant; mixing the liquefied sperm with the vitrification medium; providing a sperm straw and loading the straw with 0.25 to 0.5 mL of the obtained mixture; sealing the straw with heat; and placing the straw vertically in a container with liquid nitrogen to vitrify the mixture. A portable kit is also disclosed, which makes it easy to implement the method. The kit includes a vitrification medium, some straws, a container, usage instructions, among others.

13 Claims, 2 Drawing Sheets

METHOD FOR THE VITRIFICATION OF HUMAN SEMEN AND PORTABLE KIT FOR THE APPLICATION OF SAID METHOD

CROSS REFERENCE TO RELATED APPLICATION

This Application is a 371 of PCT/IB2018/053757 filed on May 25, 2018, which is incorporated herein by reference.

DESCRIPTION

Field of Invention

This invention provides a simple, fast and effective method of human sperm vitrification allowing a significantly higher post-devitrification progressive sperm motility recovery than current slow freezing methods. This new method of vitrification is applied both to the vitrification of donor sperm samples in sperm banks and to patient samples to be used later in assisted reproduction cycles.

State of the Art

The developed non-aseptic methods comprise mostly the vitrification of the semen by direct contact with liquid nitrogen. The recovery of post-devitrification motility using these non-aseptic methods is of 20% to 30%.

In Europe an average of about 150,000 donor sperm samples are frozen per year in sperm banks and an average of 50,000 patient sperm samples are frozen in assisted reproduction clinics where about an estimated 400,000 assisted reproduction cycles are performed per year. The average price of freezing method used is around 150 to 200 euros per vial. Each vial is used to freeze approximately 15 samples equivalent to about 40 to 60 sperm straws.

WO 12028967 document describes a method for sperm cryopreservation that involves the stages of isolating free spermatozoa from seminal fluid through a density gradient or swim-up, resuspending and mixing the spermatozoa with a vitrification medium including a buffer medium and a non-permeable cryoprotectant such as sucrose. Then, mixing and adjusting the final concentration of spermatozoa; deposit the sperm suspension in the vitrification medium in a thermoconductor container with a system of two plastic straws placed horizontally, immerse the sealed straws containing the sperm in liquid nitrogen, maintain the straws at a temperature below −75° C. after vitrifying the sperm, and devitrify the sample in a devitrification medium at 37° C. A kit containing sufficient medium for 50 straws is also provided (see WO summary 12028967). However, this document does not mention the use of permeable cryoprotectants, moreover, it shows the opposite in the last paragraph on page 6 ("[ . . . ] formulation without permeable cryoprotectants [ . . . ]"). Additionally, this invention uses whole liquefied sperm, while WO 12028967 document mentions the use of spermatozoa free of sperm plasma for maintaining aseptic conditions. Finally, WO 12028967 document uses a container consisting of a straw within a straw in a horizontal position, while the container of the present invention consists of a straw which is deposited within a trapezoidal container in a vertical position for liquid nitrogen immersion. Placing the straw in a vertical position is a critical step in this new method of aseptic vitrification of semen since if the straw were placed in a horizontal position the post-thaw motility would be less to 5%.

The CN 106962323 document provides a conservation and reanimation method in non-human primate spermatozoa refrigeration that includes the liquefaction of the spermatozoa at room temperature. Spermatozoa are diluted with an HTF culture solution, glycerin is added based on the sperm volume; the mixture obtained is subpackaged in cryopreservation tubes, stored in suspension over liquid nitrogen, and then stored in liquid nitrogen At resuscitation, the cryopreservation tubes stored in liquid nitrogen are slightly shaken in a water bath at 37° C. However, this document refers to a method of keeping the samples at 4° C. for 30 minutes and then transferring them to liquid nitrogen, but only on the liquid surface, not in contact with the surface of the liquid. In contrast, the present invention does contact the samples with liquid nitrogen, hence the freezing stage is much faster.

This invention provides a simple, fast and effective sperm vitrification method which allows a recovery of progressive sperm motility after devitrification of 80 to 95%, whether in samples from normozoospermic patients or oligospermic patients and/or patients with other alterations in the seminal parameters. The vitrification time is about 10 seconds and the devitrification time about 50 seconds, which allows the easy incorporation of the method in andrology laboratories of sperm banks and assisted reproduction clinics. The invention can be applied to the vitrification of donor sperm samples in sperm banks as well as patient samples to be used later in assisted reproduction cycles.

In addition, the aseptic vitrification described by the invention presents improvements in vitrification and devitrification time, as well as in the percentage of motility recovery. In non-aseptic vitrification methods, about 5 minutes are usually used for vitrification and a similar time period for devitrification. In contrast, the invention provides an aseptic vitrification method comprising approximately a vitrification time of 10 seconds and a devitrification time of 50 seconds. Thus, the rate of motility recovery, which is about 80 to 95% in the invention, is higher than the rate of motility recovery of non-aseptic methods which is about 20 to 30%.

DESCRIPTION OF THE INVENTION

Figure 1:
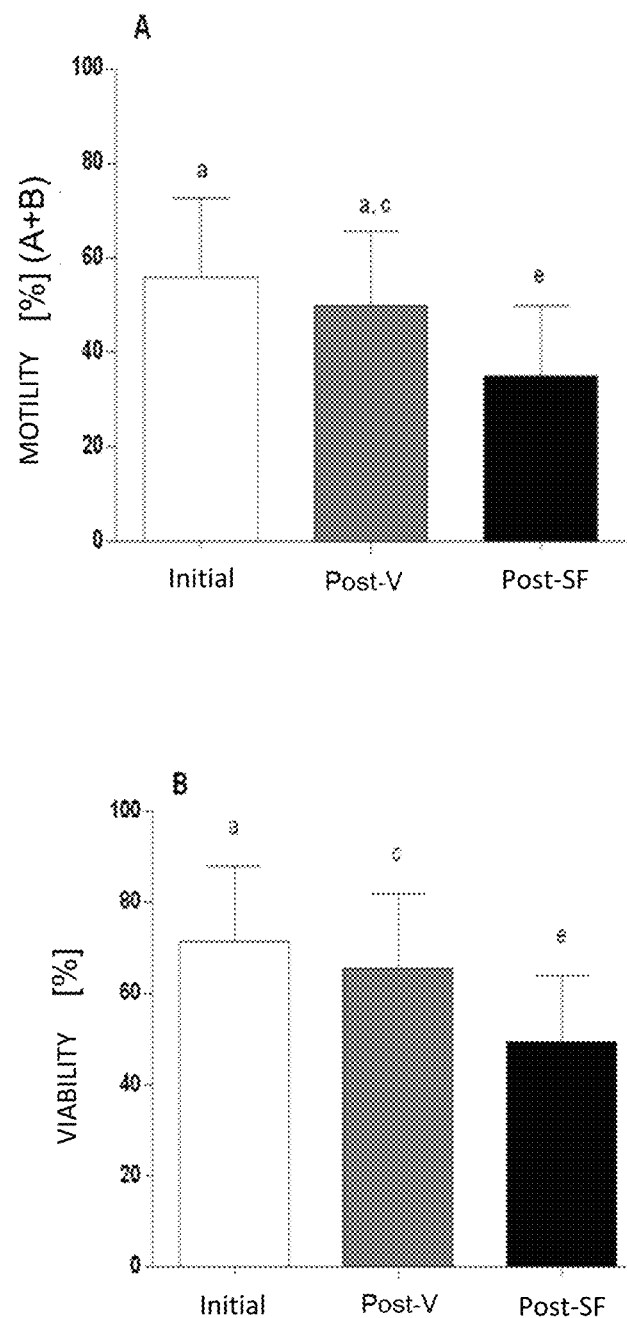
FIG. 1: Motility (A) and sperm viability (B) in post-thawed spermatozoa when comparing two preservation methods. N=50. Different letters show significant differences (p<0.05). Initial means samples before undergoing preservation methods. Post-V means the results obtained by the method of the present invention. Post-SF means the results obtained with a slow freezing method.
Figure 2:
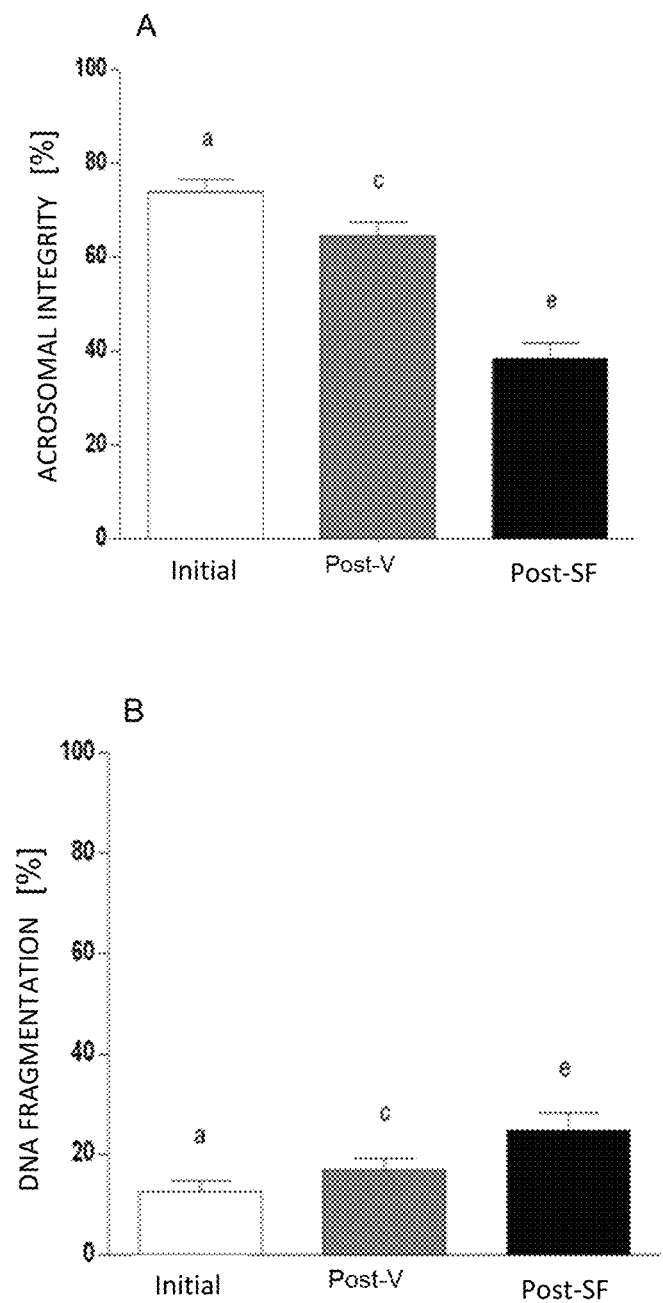
FIG. 2: The acrosome integrity (A) and DNA fragmentation (B) in post-thawed spermatozoa are shown when two preservation methods are compared. N=50. Different letters show significant differences (p<0.05). Initial means samples before undergoing preservation methods. Post-V means the results obtained by this invention method. Post-SF means the results obtained with a slow freezing method.

The invention describes a method for the aseptic of human sperm vitrification including the following stages:
(i) Providing liquefied human sperm;
(ii) Providing a vitrification medium, where the vitrification medium includes:
   a. a sperm buffer;

b. a cryoprotectant mixture, including a permeable cryoprotectant and a non-permeable cryoprotectant (iii) Mixing the liquefied semen from stage (i) with the vitrification medium from stage (ii) (iv) Providing a sperm straw and loading the sperm straw with 0.25 to 0.5 mL of the mixture obtained in stage (iii);

(v) Sealing the straw with heat; and (vi) Vitrifying the stage (iii) mixture by placing the straw vertically in the center of the widest part of a container with liquid nitrogen for 10 to 20 seconds.

In a specification of the invention the ratio of liquefied sperm used in the method of the invention is in a ratio of volume of liquefied sperm to volume of straw in the range of 1:2 to 1.7:2. Preferably, no less than 0.25 mL of liquefied sperm is provided for a 0.5 mL straw.

Preferably, the permeable cryoprotectant is glycerol, dimethyl sulfoxide, propanediol or other permeable cryoprotectants, and it is used for the preparation of the vitrification medium at an undiluted concentration in the range of 10% to 30% v/v. On the other hand, the non-permeable cryoprotectant corresponds to non-permeable sugars such as raffinose, sucrose, lactose, trehalose or other non-permeable sugars, and is used for the preparation of the vitrification medium at an undiluted concentration in a range between 10% and 30% v/v.

In an invention specification, the cryoprotectants are diluted in the sperm buffer medium at a dilution of 1:2 v/v, where the sperm buffer belongs to any sperm buffer available. Preferably, the buffer medium has human serum albumin, pyruvate, 4-(2-hydroxyethyl)-1-piperazinetanosulfonic acid (HEPES), phenol red, and others.

In an invention specification, the final concentration of the permeable cryoprotectant in the vitrification medium is in the range between 3% and 10%, and the final concentration of the non-permeable cryoprotectant in the vitrification medium is between 3% and 10%.

In an invention specification, the ratio of the liquefied sperm mixture to vitrification medium of stage (iii) is 1:1 v/v, to obtain a final concentration of the permeable cryoprotectant in the range between 1.5% and 10% and a final concentration of the non-permeable cryoprotectant in the range between 3% and 15%.

In an invention specification, the straws are made of a heat-conductive material, such as plastic, where both ends of the straw are heat-sealed.

In a preferred mode of the invention the container used in stage (vi) is a plastic tube or goblet, where the goblet has a trapezoidal, rectangular, "V" shape, or similar. In an even more preferred mode, the container is a trapezoidal shaped plastic goblet with the following dimensions: 10 to 12 cm height×1.5 to 2.0 cm depth×1.0 to 1.5 cm width (widest)× 0.25 to 0.5 cm in width (narrowest).

In a preferred mode, the straw is placed in the center of the widest part of the goblet. This configuration provides the best results in terms of post-devitrification motility.

In an invention specification, the heat-sealed straw is immersed in an upright position in liquid nitrogen in a trapezoidal or similar shaped container and in a range of 8 to 16 cm in height, with the cotton pad of the straw facing upwards for a period of time between 10 and 20 seconds, the heat-sealed straw is being immersed in the center of the base of the container while the top of the straw is pressed towards the bottom of the container. This configuration provides the best results in post-devitrification motility.

As an option, straws can be labeled before the vitrification by means of automated thermal labeling (or with a simple marker); or a FreezerBondz type label can be applied after the straw is vitrified.

As an option, after vitrification the straw is stored in a liquid nitrogen tank canister. Optionally, the straws are also devitrified by placing them in a water bath at a temperature in the range of 38° C. to 46° C., for a time range of 40 to 60 seconds.

The invention, in another format, provides a portable kit in which the invention method can be implemented. Such kit contains a vitrification medium, some straws, a container, usage instructions, among others, for method and kit implementation. The vitrification medium includes: a mixture of cryoprotectants—including a permeable cryoprotectant and a non-permeable cryoprotectant, and a sperm buffer medium. For example, a quantity of 20 straws, 50 ml of the vitrification medium, a container 12 cm high×2.0 cm deep× 1.7 cm wide×0.5 cm wide, among others.

Specifically, the elements of the kit are in the concentrations, proportions and conditions described above.

Example

As an example, the invention provides a method of aseptic sperm vitrification. This method was performed on 50 sperm samples obtained from the ANDROGEN sperm bank, and it was compared with a standard slow freezing procedure on the same amount of samples. This method was carried out as follows:

(a) 0.25 mL of liquefied sperm was mixed with 0.25 mL of Sperm Cryoprotect-II (SCP-II) (Nidacon) diluted 1:1 with SpermWash culture medium (CRYOS International);

(b) 0.5 mL of the sperm/SCP-II mixture was loaded into 0.5 mL CBS straws and both ends were heat-sealed using a Cryo Bio Systems Press Sealer;

(c) straws were transferred to the canister of a steam-saturated liquid nitrogen tank for 5 minutes;

(d) after freezing, the straws were transferred to one of the goblet boxes in the storage tank and immersed in liquid nitrogen;

(e) for defrosting the straws, they were immersed in a water bath at 37° C. for 5 minutes.

For the vitrification of the present invention the following procedure was carried out:

(a) 0.25 mL of liquefied sperm was provided for a 0.5 mL straw;

(b) 20 mL was prepared from a vitrification medium, which contains:
  (i) a SpermWash Medium (CRYOS International®) sperm buffer medium, and
  (ii) a permeable cryoprotectant made of glycerol (CryoSperm (Origio®)) at an undiluted stock concentration of 20% v/v; and a non-permeable cryoprotectant made of raffinose (Sigma-Aldrich No. R0250) at an undiluted stock concentration of 18% v/v; where cryoprotectants were diluted with the buffer medium at a volumetric ratio of 1:2 to obtain a 6.6% glycerol and 6% raffinose concentration, and (c) 0.25 mL of liquefied sperm was immediately mixed with 0.25 mL of the vitrification medium (at a ratio of 1:1 v/v) until a final glycerol concentration of 3.3% and a final raffinose concentration of 3% was obtained;

(d) 0.5 mL of the sperm/cryoprotectant mixture was loaded into 0.5 mL high-security plastic straws; and both ends of the straw were heat-sealed using a Cryo Bio Systems Press Sealer;

(e) the heat-sealed straw was vertically immersed in liquid nitrogen in a trapezoidal-shaped container (5×2×1.7 cm) and at 12 cm high, with the cotton pad side of the straw facing upwards for a period of 15 seconds, the heat-sealed straw being immersed in the center of the container base while the top of the straw was pressed towards the bottom of the container; and (d) the straws were devitrified by placing them in a water bath at 42.5° C. for 50 seconds.

Once the procedure was completed, a measurement of motility by phase microscopy, sperm viability by light field microscopy after eosin staining, acrosome integrity by light field microscopy at 1000× and sperm DNA fragmentation by post-thaw TUNEL test was performed in both methods (vitrification of this invention and slow freezing method).

Below are the tables with the results obtained, where V: vitrification; SF: slow freezing; MOT: progressive motility; VIAB: viability; ACRO: acrosome; DNAF: DNA fragmentation.

Table 1: Comparison of sperm motility before and after both preservation methods.

Table 2: Comparison of sperm viability before and after both preservation methods.

Table 3: Acrosomal integrity of spermatozoa before and after both preservation methods.

Table 4: Sperm DNA fragmentation before and after both preservation methods.

TABLE 1

| Sample No | Initial MOT % | post-V MOT % | post-SF MOT % |
|---|---|---|---|
| 1 | 77 | 66 | 50 |
| 2 | 50 | 40 | 20 |
| 3 | 70 | 65 | 55 |
| 4 | 75 | 67 | 50 |
| 5 | 70 | 65 | 55 |
| 6 | 60 | 55 | 40 |
| 7 | 67 | 60 | 50 |
| 8 | 66 | 63 | 45 |
| 9 | 80 | 76 | 60 |
| 10 | 50 | 40 | 30 |
| 11 | 67 | 56 | 40 |
| 12 | 65 | 50 | 40 |
| 13 | 70 | 65 | 50 |
| 14 | 77 | 65 | 45 |
| 15 | 75 | 70 | 50 |
| 16 | 60 | 55 | 40 |
| 17 | 66 | 60 | 45 |
| 18 | 55 | 45 | 30 |
| 19 | 40 | 30 | 25 |
| 20 | 80 | 70 | 55 |
| 21 | 45 | 40 | 30 |
| 22 | 65 | 58 | 40 |
| 23 | 70 | 65 | 50 |
| 24 | 75 | 70 | 60 |
| 25 | 40 | 35 | 30 |
| 26 | 30 | 28 | 25 |
| 27 | 55 | 52 | 40 |
| 28 | 70 | 65 | 50 |
| 29 | 75 | 68 | 55 |
| 30 | 77 | 70 | 52 |
| 31 | 45 | 40 | 22 |
| 32 | 40 | 32 | 17 |
| 33 | 50 | 43 | 24 |
| 34 | 35 | 29 | 15 |
| 35 | 57 | 50 | 33 |
| 36 | 43 | 39 | 22 |
| 37 | 32 | 30 | 16 |
| 38 | 21 | 19 | 10 |

TABLE 1-continued

| Sample No | Initial MOT % | post-V MOT % | post-SF MOT % |
|---|---|---|---|
| 39 | 51 | 46 | 23 |
| 40 | 40 | 35 | 18 |
| 41 | 41 | 37 | 19 |
| 42 | 35 | 30 | 16 |
| 43 | 37 | 30 | 15 |
| 44 | 20 | 16 | 9 |
| 45 | 38 | 32 | 16 |
| 46 | 45 | 37 | 25 |
| 47 | 40 | 34 | 24 |
| 48 | 60 | 53 | 35 |
| 49 | 70 | 65 | 40 |
| 50 | 75 | 70 | 45 |
| Average | 55.94 | 49.62 | 35.02 |

TABLE 2

| Sample No | Initial VIAB % | post-V VIAB % | post-SF VIAB % |
|---|---|---|---|
| 1 | 92 | 82 | 64 |
| 2 | 66 | 56 | 34 |
| 3 | 87 | 80 | 68 |
| 4 | 93 | 83 | 65 |
| 5 | 86 | 80 | 68 |
| 6 | 76 | 71 | 56 |
| 7 | 82 | 76 | 66 |
| 8 | 82 | 79 | 60 |
| 9 | 93 | 92 | 75 |
| 10 | 66 | 56 | 46 |
| 11 | 81 | 72 | 55 |
| 12 | 82 | 67 | 56 |
| 13 | 79 | 80 | 63 |
| 14 | 93 | 81 | 59 |
| 15 | 90 | 87 | 60 |
| 16 | 76 | 70 | 53 |
| 17 | 82 | 76 | 58 |
| 18 | 74 | 62 | 46 |
| 19 | 54 | 41 | 40 |
| 20 | 96 | 87 | 69 |
| 21 | 60 | 57 | 45 |
| 22 | 79 | 75 | 54 |
| 23 | 84 | 80 | 65 |
| 24 | 90 | 86 | 69 |
| 25 | 56 | 50 | 44 |
| 26 | 46 | 45 | 40 |
| 27 | 70 | 68 | 54 |
| 28 | 85 | 81 | 66 |
| 29 | 90 | 85 | 70 |
| 30 | 93 | 87 | 66 |
| 31 | 60 | 56 | 36 |
| 32 | 56 | 48 | 33 |
| 33 | 66 | 59 | 39 |
| 34 | 51 | 45 | 31 |
| 35 | 73 | 66 | 47 |
| 36 | 59 | 55 | 36 |
| 37 | 49 | 46 | 31 |
| 38 | 35 | 35 | 26 |
| 39 | 65 | 61 | 38 |
| 40 | 56 | 51 | 33 |
| 41 | 54 | 54 | 34 |
| 42 | 51 | 44 | 31 |
| 43 | 54 | 46 | 30 |
| 44 | 35 | 32 | 23 |
| 45 | 54 | 47 | 30 |
| 46 | 61 | 52 | 40 |
| 47 | 56 | 50 | 39 |
| 48 | 76 | 70 | 50 |
| 49 | 87 | 81 | 55 |
| 50 | 91 | 87 | 61 |
| Average | 71.44 | 65.54 | 49.54 |

TABLE 3

| Sample No | Initial ACRO % | post-V ACRO % | post-SF ACRO % |
|---|---|---|---|
| 1 | 78.35 | 67.6 | 43.8 |
| 2 | 72.32 | 61 | 35.2 |
| 3 | 78.75 | 63.12 | 41.4 |
| 4 | 70.6 | 60.25 | 43.77 |
| 5 | 79.56 | 69.07 | 40.35 |
| 6 | 71.12 | 63.4 | 39.29 |
| 7 | 75.3 | 64.3 | 42.12 |
| 8 | 74.25 | 67.3 | 41.4 |
| 9 | 72 | 60.5 | 35.6 |
| 10 | 70.9 | 60.7 | 43.2 |
| 11 | 75 | 66.9 | 41.46 |
| 12 | 73.12 | 68.5 | 42.65 |
| 13 | 78.4 | 65.6 | 40.21 |
| 14 | 77.12 | 67.8 | 39.36 |
| 15 | 70.67 | 59.2 | 40.05 |
| 16 | 72.5 | 61.4 | 41.15 |
| 17 | 73.9 | 65.5 | 35.67 |
| 18 | 73.4 | 63.2 | 38.6 |
| 19 | 70.2 | 65.3 | 35.12 |
| 20 | 74.4 | 60.5 | 36.7 |
| 21 | 79.34 | 65.34 | 34.38 |
| 22 | 71.13 | 65.2 | 36.25 |
| 23 | 75.25 | 66.6 | 38.34 |
| 24 | 74.12 | 61.25 | 40.54 |
| 25 | 76.3 | 68.5 | 43.54 |
| 26 | 72.91 | 69.7 | 41.6 |
| 27 | 77.45 | 60.6 | 35.9 |
| 28 | 71.44 | 67.4 | 41.4 |
| 29 | 73.56 | 66.8 | 41.7 |
| 30 | 75.21 | 67.5 | 42.2 |
| 31 | 71.24 | 60.2 | 36.4 |
| 32 | 72.35 | 60.3 | 34.2 |
| 33 | 74.45 | 66.6 | 35.7 |
| 34 | 75.23 | 66.4 | 37.2 |
| 35 | 70.23 | 69.8 | 38.6 |
| 36 | 73.78 | 60.25 | 31.4 |
| 37 | 78.66 | 68.43 | 43.5 |
| 38 | 75.83 | 67.8 | 36.6 |
| 39 | 72.25 | 63.5 | 33.7 |
| 40 | 73.55 | 64.3 | 38.6 |
| 41 | 70.23 | 65.6 | 40.2 |
| 42 | 72.75 | 62.7 | 37.6 |
| 43 | 75.89 | 66.7 | 35.3 |
| 44 | 70.58 | 60.2 | 33.45 |
| 45 | 72.24 | 62.5 | 35.5 |
| 46 | 71.3 | 65.6 | 39.6 |
| 47 | 74.6 | 61.5 | 38.2 |
| 48 | 77.5 | 65.4 | 34.7 |
| 49 | 71.5 | 62.12 | 35.12 |
| 50 | 72.45 | 65.15 | 34.6 |
| Average | 73.9 | 64.5 | 38.4 |

TABLE 4

| Sample No | initial DNAF | post-V DNAF | post-SF DNAF |
|---|---|---|---|
| 1 | 10.4 | 18.2 | 28.81 |
| 2 | 12.5 | 16.8 | 26.2 |
| 3 | 8.9 | 15.25 | 30.52 |
| 4 | 10.2 | 15.77 | 29.6 |
| 5 | 12.4 | 14.98 | 28.4 |
| 6 | 14.4 | 17.7 | 25.5 |
| 7 | 11.4 | 12.87 | 22.4 |
| 8 | 12.5 | 15.6 | 21.6 |
| 9 | 7.8 | 12.7 | 23.4 |
| 10 | 14.6 | 17.2 | 28.9 |
| 11 | 12.6 | 21.6 | 32.5 |
| 12 | 14.2 | 19.8 | 32.9 |
| 13 | 11.3 | 18.9 | 31.4 |
| 14 | 10.8 | 14.5 | 23.5 |
| 15 | 11.1 | 15.1 | 30.15 |
| 16 | 13.6 | 17.2 | 25.25 |
| 17 | 14.2 | 16.5 | 27.65 |
| 18 | 12.5 | 17.3 | 25.6 |
| 19 | 15.6 | 18.2 | 21.4 |
| 20 | 6.7 | 13.3 | 18.9 |
| 21 | 14.9 | 21.2 | 29.2 |
| 22 | 13.2 | 17.5 | 24.6 |
| 23 | 11.6 | 13.4 | 19.6 |
| 24 | 10.7 | 13.7 | 21.2 |
| 25 | 14.8 | 15.6 | 23.45 |
| 26 | 16.3 | 18.2 | 23.5 |
| 27 | 14.2 | 17.1 | 24.1 |
| 28 | 11.5 | 13.4 | 22.8 |
| 29 | 10.1 | 15.2 | 20.3 |
| 30 | 9.9 | 12.1 | 18.4 |
| 31 | 13.4 | 18.4 | 22.5 |
| 32 | 13.7 | 16.4 | 21.7 |
| 33 | 12.8 | 16.8 | 20.9 |
| 34 | 14.7 | 19.9 | 24.2 |
| 35 | 15.1 | 20.2 | 28.7 |
| 36 | 13.6 | 17.4 | 24.5 |
| 37 | 14.2 | 19.5 | 23.5 |
| 38 | 14.75 | 18.2 | 22.3 |
| 39 | 12.4 | 17.2 | 25.5 |
| 40 | 11.1 | 15.3 | 21.2 |
| 41 | 13.2 | 17.8 | 24.6 |
| 42 | 14.1 | 19.1 | 24.4 |
| 43 | 13.9 | 17.4 | 22.7 |
| 44 | 12.8 | 18.2 | 23.45 |
| 45 | 14.4 | 19.2 | 25.5 |
| 46 | 11 | 16.8 | 20.1 |
| 47 | 15.2 | 18.7 | 22.1 |
| 48 | 13.2 | 16.9 | 28.4 |
| 49 | 13 | 17.5 | 24.1 |
| 50 | 14.15 | 17.6 | 25.5 |
| Average | 12.7 | 16.9 | 24.8 |

Table 1 shows that the method of this invention achieves a sperm motility of 80-90% after vitrification in relation to the initial motility, while a slow freezing method only achieves 50-60% motility.

Table 2 shows that the method of this invention achieves a sperm viability of 90-95% after vitrification in relation to the initial viability, whereas the slow-freezing method only obtains 65-70% of viability.

Table 3 shows that the method of this invention achieves an acrosome sperm integrity of 85-90% after vitrification in relation to the initial acrosome integrity, whereas the slow freezing method obtains 45-55% integrity.

Table 4 shows that the method of the present invention reduces sperm DNA fragmentation as compared to other methods. With this method, an increase of 30-35% of fragmentation is obtained, whereas with the slow-freezing method 90-100% of DNA fragmentation is obtained.

According to what was shown above, the invention can be applied both to the vitrification of donor sperm samples in sperm banks, as well as to the vitrification of samples from patients who are either going to carry out assisted reproduction cycles, or are going to undergo vasectomy surgery or receive chemo and/or radiotherapy treatments. In the case of sperm banks, aseptic sperm vitrification means not only a significant saving in staff time but also an improvement in the rate of recovery of sperm motility after devitrification. In the case of assisted reproduction clinics, the increased recovery of sperm motility after devitrification, as shown in the example, will mean an increase in the recovery of mobile sperm isolated by density gradient or swim-up (REM) and a significant improvement in the clinical results obtained in assisted reproduction techniques.

The invention claimed is:

1. A method for the aseptic vitrification of human sperm comprising the following stages:
   (i) providing liquefied human sperm;
   (ii) providing a vitrification medium, wherein the vitrification medium comprises:
      a) a sperm buffer;
      b) a cryoprotectant mixture including a permeable cryoprotectant and a non-permeable cryoprotectant;
   (iii) mixing the liquefied sperm from stage (i) with the vitrification medium from stage (ii) to obtain a mixture;
   (iv) providing a sperm straw and loading such sperm straw with 0.25 to 0.5 mL of the mixture obtained in stage (iii);
   (v) sealing the straw with heat; and
   (vi) inserting the straw from stage (v) vertically in an upright position into a container with liquid nitrogen for a period of time between 10 and 20 seconds to vitrify the mixture, wherein the straw remains immersed for the entire 10-20 second period, in the upright position while a top of the straw is pressed towards a bottom of the container, after which the straw is transferred directly to liquid nitrogen storage without thawing,
   wherein the permeable cryoprotectant is used at an undiluted concentration in a range between 10% and 30% v/v and the non-permeable cryoprotectant is used at an undiluted concentration in the range of 10% to 30% v/v.

2. The method according to claim 1, wherein a ratio of liquefied sperm volume to straw volume is in a range of 1:2 to 1.7:2.

3. The method according to claim 1, wherein the permeable cryoprotectant is glycerol, dimethyl sulfoxide, or propanediol.

4. The method according to claim 1, wherein the non-permeable cryoprotectant is non-permeable sugars comprising raffinose, sucrose, lactose, or trehalose.

5. The method according to claim 1, wherein the cryoprotectants are diluted in the sperm buffer medium at a dilution of 1:2 v/v.

6. The method according to claim 5, wherein the sperm buffer comprises human serum albumin, pyruvate, 4-(2-hydroxyethyl)-1-piperazinetanosulfonic acid (HEPES), or phenol red.

7. The method according to claim 1, wherein the ratio of the liquefied sperm mixture to the vitrification medium of stage (iii) is 1:1 v/v, to obtain a concentration of the permeable cryoprotectant in the range between 1.5% and 10% and a concentration of the non-permeable cryoprotectant in the range between 3% and 15%.

8. The method according to claim 1, wherein the straws are made of a heat-conducting material.

9. The method according to claim 1, wherein the container used in stage (vi) is a plastic or gobelet tube, wherein the gobelet is trapezoidal, rectangular, or "V" shaped.

10. The method according to claim 9, wherein the straw is introduced in vertical position in a center of a widest part of the container with liquid nitrogen.

11. The method according to claim 1, wherein after the vitrification stage (vi) the straw is stored in a liquid nitrogen tank canister.

12. The method according to claim 1, wherein the straws are devitrified by being introduced into a water bath at a temperature in a range of 38° C. to 46° C., for a time range of 40 to 60 seconds.

13. The method according to claim 1, wherein the container is a trapezoidal-shaped container such that the heat-sealed straw is immersed in a center of the container base while a top of the straw is pressed towards a bottom of the container.

* * * * *